US006450557B1

(12) United States Patent
Martinez

(10) Patent No.: US 6,450,557 B1
(45) Date of Patent: Sep. 17, 2002

(54) OBJECT RETRIEVING DEVICE

(76) Inventor: Benjamin R. Martinez, 1250 Kendall Dr., Apt. #D-305, San Bernardino, CA (US) 92407-4151

( * ) Notice: Subject to any disclaimer, the term of this patent is extended or adjusted under 35 U.S.C. 154(b) by 0 days.

(21) Appl. No.: 09/810,046

(22) Filed: Mar. 16, 2001

(51) Int. Cl.[7] .................................................. B25J 1/04
(52) U.S. Cl. ......................... 294/19.1; 294/24; 294/51
(58) Field of Search ........................... 294/19.1, 22–24, 294/26, 51, 55, 57; 172/375; 56/400.04, 400.19; 15/105, 144.4

(56) References Cited

U.S. PATENT DOCUMENTS

| | | | | | |
|---|---|---|---|---|---|
| 2,031,044 | A | * | 2/1936 | Jensen et al. | 294/19.1 |
| 2,319,992 | A | * | 5/1943 | Hubbard | 294/19.1 |
| 2,562,794 | A | * | 7/1951 | Kalish | 294/24 |
| 2,606,050 | A | * | 8/1952 | Morris et al. | 172/375 |
| 3,463,533 | A | * | 8/1969 | Repiscak et al. | 294/19.1 |
| 4,575,143 | A | | 3/1986 | Nast | |
| 4,793,646 | A | | 12/1988 | Michaud, Jr. | |
| D342,428 | S | | 12/1993 | Olszak | |
| 5,415,446 | A | * | 5/1995 | Olson et al. | 294/19.1 |
| D373,289 | S | | 9/1996 | Hart | |
| 5,593,196 | A | | 1/1997 | Baum et al. | |
| 5,628,538 | A | | 5/1997 | Ericksen | |
| 5,794,998 | A | * | 8/1998 | Lapierre | 294/26 |
| 5,799,996 | A | * | 9/1998 | Fredrickson | 294/51 |

* cited by examiner

*Primary Examiner*—Dean J. Kramer

(57) ABSTRACT

An object retrieving device for extending the effective reach of the user for picking up and carrying objects located out of the convenient reach of the user, especially in confined spaces. The object retrieving device includes an extendable handle comprised of a plurality of telescopic sections having a collapsed condition and an extended condition, a distal one of the telescopic sections having a free end with a recess extending into the free end and a retrieving attachment removably mountable on the free end of the distal telescopic section.

18 Claims, 3 Drawing Sheets

OBJECT RETRIEVING DEVICE

BACKGROUND OF THE INVENTION

1. Field of the Invention

The present invention relates to reach extending devices and more particularly pertains to a new object retrieving device for extending the effective reach of the user for picking up and carrying objects located out of the convenient reach of the user, especially in confined spaces.

2. Description of the Prior Art

The use of reach extending devices is known in the prior art. More specifically, reach extending devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,793,646; U.S. Pat. No. 5,593,196; U.S. Pat. No. 5,628,538; U.S. Pat. No. 4,575,143; U.S. Pat. No. Des. 373,289; and U.S. Pat. No. Des. 342,428.

While these devices fulfill their respective, particular objectives and requirements, the aforementioned patents do not disclose a new object retrieving device. The inventive device includes an extendable handle comprised of a plurality of telescopic sections having a collapsed condition and an extended condition, a distal one of the telescopic sections having a free end with a recess extending into the free end and a retrieving attachment removably mountable on the free end of the distal telescopic section.

In these respects, the object retrieving device according to the present invention substantially departs from the conventional concepts and designs of the prior art, and in so doing provides an apparatus primarily developed for the purpose of extending the effective reach of the user for picking up and carrying objects located out of the convenient reach of the user, especially in confined spaces.

SUMMARY OF THE INVENTION

In view of the foregoing disadvantages inherent in the known types of reach extending devices now present in the prior art, the present invention provides a new object retrieving device construction wherein the same can be utilized for extending the effective reach of the user for picking up and carrying objects located out of the convenient reach of the user, especially in confined spaces.

The general purpose of the present invention, which will be described subsequently in greater detail, is to provide a new object retrieving device apparatus and method which has many of the advantages of the reach extending devices mentioned heretofore and many novel features that result in a new object retrieving device which is not anticipated, rendered obvious, suggested, or even implied by any of the prior art reach extending devices, either alone or in any combination thereof.

To attain this, the present invention generally comprises an extendable handle comprised of a plurality of telescopic sections having a collapsed condition and an extended condition, a distal one of the telescopic sections having a free end with a recess extending into the free end and a retrieving attachment removably mountable on the free end of the distal telescopic section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new object retrieving device apparatus and method which has many of the advantages of the reach extending devices mentioned heretofore and many novel features that result in a new object retrieving device which is not anticipated, rendered obvious, suggested, or even implied by any of the prior art reach extending devices, either alone or in any combination thereof.

It is another object of the present invention to provide a new object retrieving device which may be easily and efficiently manufactured and marketed.

It is a further object of the present invention to provide a new object retrieving device which is of a durable and reliable construction.

An even further object of the present invention is to provide a new object retrieving device which is susceptible of a low cost of manufacture with regard to both materials and labor, and which accordingly is then susceptible of low prices of sale to the consuming public, thereby making such object retrieving device economically available to the buying public.

Still yet another object of the present invention is to provide a new object retrieving device which provides in the apparatuses and methods of the prior art some of the advantages thereof, while simultaneously overcoming some of the disadvantages normally associated therewith.

Still another object of the present invention is to provide a new object retrieving device for extending the effective reach of the user for picking up and carrying objects located out of the convenient reach of the user, especially in confined spaces.

Yet another object of the present invention is to provide a new object retrieving device which includes an extendable handle comprised of a plurality of telescopic sections having a collapsed condition and an extended condition, a distal one of the telescopic sections having a free end with a recess extending into the free end and a retrieving attachment removably mountable on the free end of the distal telescopic section.

Still yet another object of the present invention is to provide a new object retrieving device that has interchangeable heads allowing the reach extending device to be adapted to multiple applications and environments.

Even still another object of the present invention is to provide a new object retrieving device that is lightweight, portable, and reduces the chance of back strain and physical injury.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
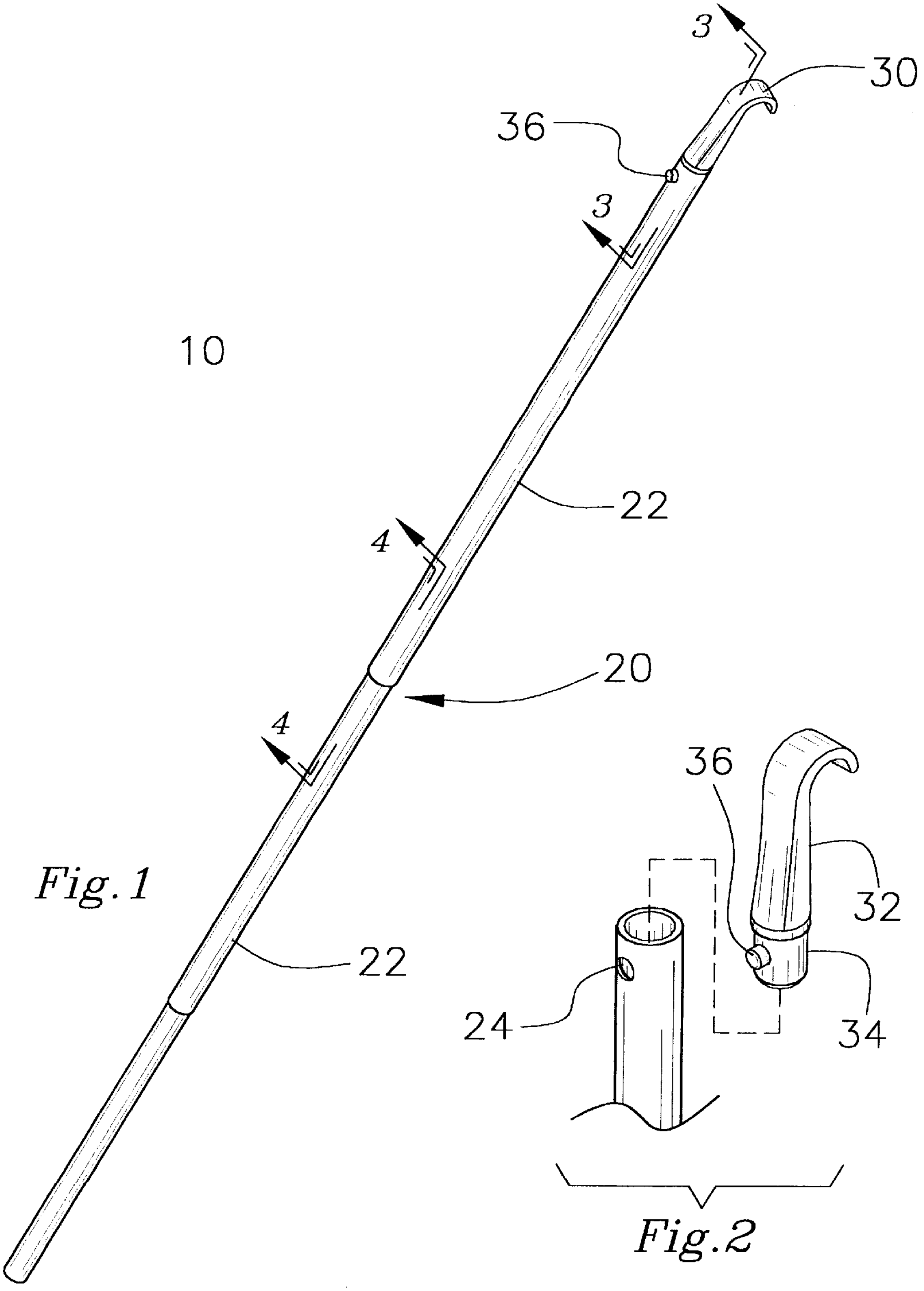
FIG. 1 is a schematic perspective view of a new object retrieving device according to the present invention.
FIG. 2 is a schematic detail view of the J-hook attachment and distal telescoping section of the present invention.
Figure 3:
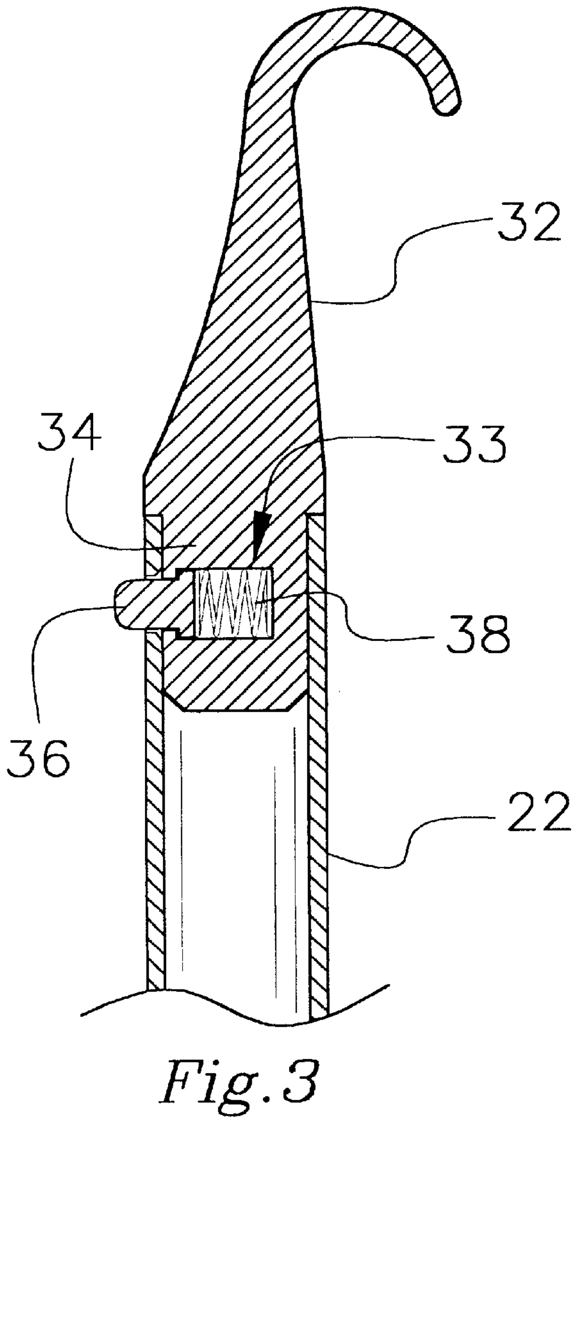
FIG. 3 is a schematic cross-sectional view of the present invention taken along line 3—3 of FIG. /1.
Figure 4:
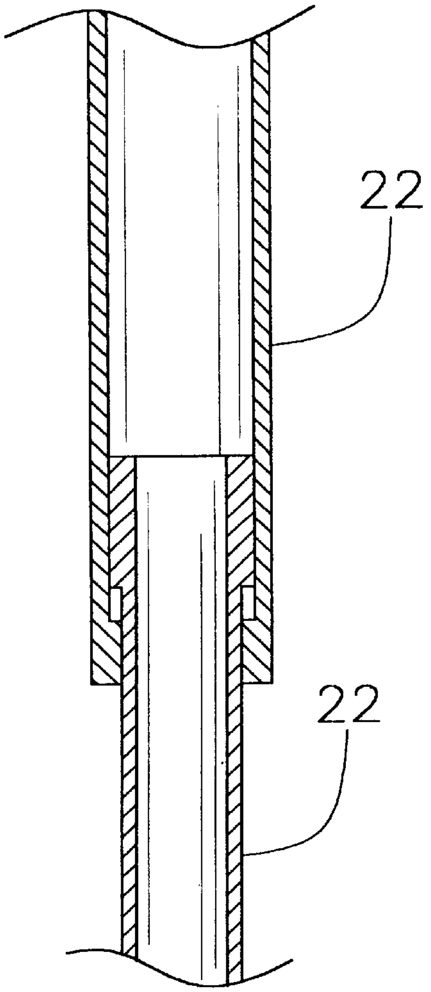
FIG. 4 is a schematic cross-sectional view of the extendable handle of the present invention taken along line 4—4 of FIG. 1.
Figure 5:
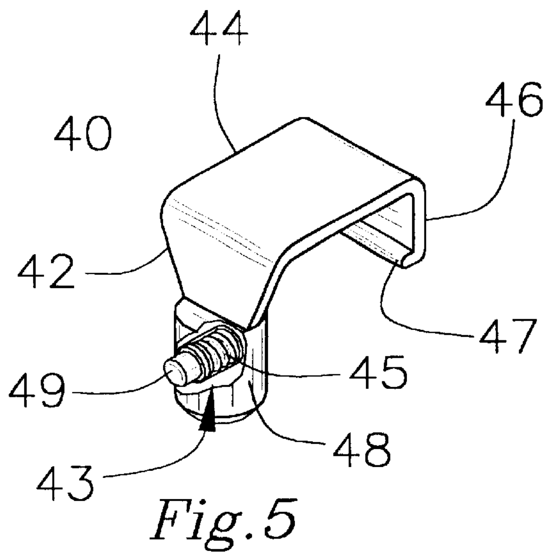
FIG. 5 is a schematic perspective view of the scoop attachment of the present invention.
Figure 6:
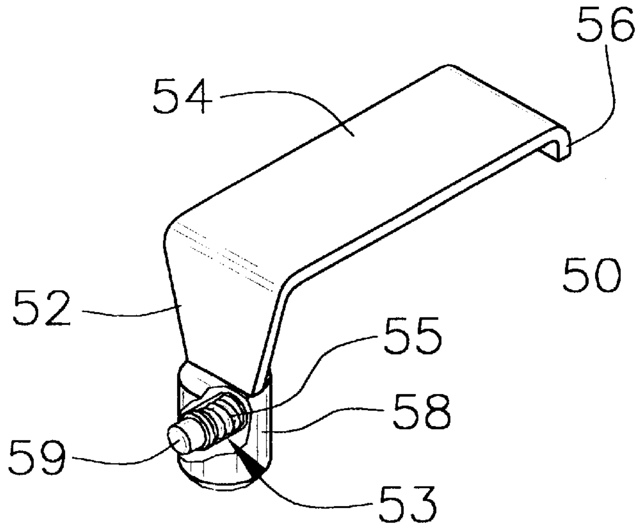
FIG. 6 is a schematic perspective view of the sweep attachment of the present invention.
Figure 7:
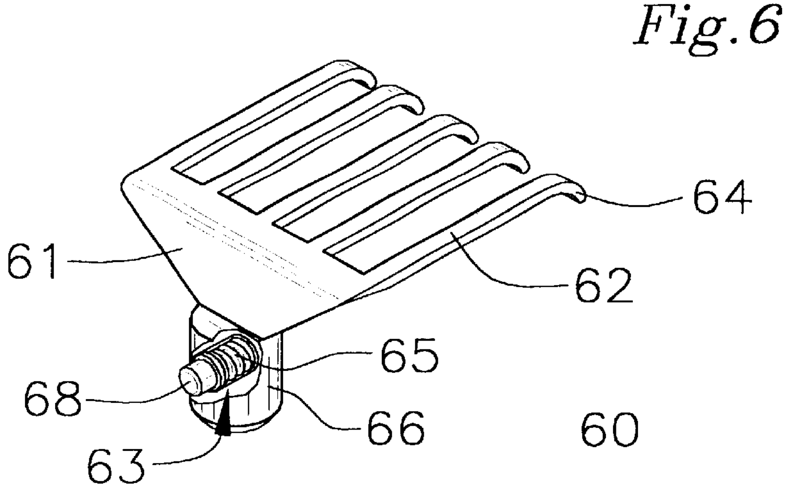
FIG. 7 is a schematic perspective view of the rake attachment of the present invention.

With reference now to the drawings, and in particular to FIGS. 1 through 7 thereof, a new object retrieving device embodying the principles and concepts of the present invention and generally designated by the reference numeral 10 will be described.

As best illustrated in FIGS. 1 through 7, the object retrieving device 10 generally comprises an object retrieving kit for extending the reach of a user, comprising an extendable handle 20, a hook attachment 30, a scoop attachment 40, a sweep attachment 50, and a rake attachment 60.

The extendable handle 20 includes a collapsed condition and an extended condition. The handle 20 comprises a plurality of telescopic sections 22 connected in telescopic relationship. A distal one of the telescopic sections 22 includes a free end. The free end includes a recess extending into the free end of the distal telescopic section 22. An aperture 24 is formed in a wall of the distal telescopic section 22 and is in communication with an interior of the recess.

A hook attachment 30 is removably mounted on the free end of the distal telescopic section 22. The hook attachment 30 includes a J-shaped hook portion 32 and an attachment portion 34. The J-shaped hook portion 32 comprises a linear main extent and an arcuate extent connected to an end of the main extent. The J-shaped hook portion 32 includes a width approximately equal to an outer diameter of the distal telescopic section 22. The attachment portion 34 includes a connector body designed for insertion into the recess of the free end of the distal telescopic section. The attachment portion 34 includes a securing means for selectively securing the connector body in the recess of the free end. The securing means comprises a release button 36. The release button 36 is positioned in a cavity formed in the connector body. The release button 36 includes a protruding condition for extending through the aperture 24 formed in the wall of the distal telescopic section 22 and a retracted condition permitting insertion of the connector body into the recess. A biasing means 33 is provided for biasing the release button 36 into the protruding condition. The biasing means 33 comprises a spring 38.

A scoop attachment 40 is removably mounted on the free end of the distal telescopic section 22. The scoop attachment 40 includes a scoop portion and an attachment portion 48. The scoop position comprises a first extent 42, a second extent 44, and a third extent 46. The first extent 42 extends substantially parallel to a longitudinal axis of the handle 20. The second extent 44 extends substantially perpendicular to the longitudinal axis of the handle 20. The third extent 46 extends substantially parallel to the longitudinal axis of the handle 20. The second 44 and third extents 46 include a width approximately two times the width of the diameter of the distal telescopic section 22. The width and length of the second extent 44 is approximately equal. The third extent 46 includes a lip 47 extending toward the first extent 42. The first 42 and third extents 46 include substantially equal length dimensions extending parallel to the longitudinal direction of the handle 20. The length of the second extent 44 is approximately twice a length of the first extent 42. The attachment portion 48 includes a connector body designed for insertion into the recess of the free end of the distal telescopic section 22. The attachment portion 48 includes a securing means for selectively securing the connector body in the recess of the free end. The securing means comprises a release button 49. The release button 49 is positioned in a cavity formed in the connector body. The release button 49 includes a protruding condition for extending through the aperture 24 formed in the wall of the distal telescopic section 22 and a retracted condition permitting insertion of the connector body into the recess. A biasing means 43 is provided for biasing the release button 49 into the protruding condition. The biasing means 43 comprises a spring 45.

A sweep attachment 50 is removably mountable on the free end of the distal telescopic section 22. The sweep attachment 50 includes a first extent 52 and a second extent 54. The first extent 52 extends in a substantially parallel direction to the longitudinal axis of the handle 20. The second extent 54 extends in a direction substantially perpendicular to the longitudinal axis of the handle 20. The second extent 54 includes a lip 56 extending in a direction substantially parallel to the direction of the longitudinal axis of the handle 20. The second extent 54 includes a length that is approximately 1.25 times greater than the length of the first extent 52. The first 52 and second extents 54 include a width approximately two times the width of the diameter of the distal telescopic section 22. The attachment portion 58 includes a connector body designed for insertion into the recess of the free end of the distal telescopic section 22. The attachment portion 58 includes a securing means for selectively securing the connector body in the recess of the free end. The securing means comprises a release button 59. The release button 59 is positioned in a cavity formed in the connector body. The release button 59 includes a protruding condition for extending through the aperture 24 formed in the wall of the distal telescopic section 22 and a retracted condition permitting insertion of the connector body into the recess. A biasing means 53 is provided for biasing the release button 59 into the protruding condition. In an embodiment, the biasing means 53 comprises a spring 55.

The rake attachment 60 is removably mountable on the free end of the distal telescopic section 22. The rake attachment 60 includes a first extent 61 and a plurality of tines 62. The first extent 61 extends in a direction substantially parallel to the longitudinal axis of the handle 20. The plurality of tines 62 extends in a direction substantially perpendicular to the first extent 61. Free ends of the tines 62 include an arcuate tip 64. In an illustrative embodiment the rake attachment 60 has at least four tines 62. In a further illustrative embodiment the tines 62 each have a length of at least two inches. The attachment portion 66 includes a securing means for selectively securing the connector body in the recess of the free end. The securing means comprises a release button 68. The release button 68 is positioned in a cavity formed in the connector body. The release button 68 includes a protruding condition for extending through the aperture 25 formed in the wall of the distal telescopic section 22 and a retracted condition permitting insertion of the connector body into the recess. A biasing means 63 is provided for biasing the release button 68 into the protruding condition. The biasing means 63 comprising a spring 65.

In an embodiment the handle 20 comprises three telescopic sections 22. Each of the telescopic sections 22 is approximately two feet long.

In use, the user selects the desired attachment. The user then inserts the attachment portion of the desired attachment into the opening in the distal section of the handle. The release button in then placed in the retracted position and the attachment is further inserted into the handle until the release button protrudes through the aperture in the handle. The user then extends the telescopic handle to the desire length. The device can now be used to retrieve an object from a remote location.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An object retrieving device for extending the reach of a user, comprising:

an extendable handle having an collapsed condition and an extended condition, the handle comprising a plurality of telescopic sections connected in telescopic relationship, a distal one of the telescopic sections having a free end, the free end having a recess extending into the free end of the distal telescopic section, an aperture being formed in a wall of the distal telescopic section and being in communication with an interior of the recess;

a retrieving attachment removably mountable on the free end of the distal telescopic section, the retrieving attachment having an attachment portion for removably attaching the retrieving attachment to the handles wherein the retrieving attachment comprises a scoop attachment having a scoop portion mounted on the attachment portion, the scoop portion comprising a first extent extending substantially parallel to a longitudinal axis of the handle, a second extent extending substantially perpendicular to the longitudinal axis of the handle, and a third extent extending substantially parallel to the longitudinal axis of the handle; and wherein the third extent has a lip extending toward the first extent.

2. The device of claim 1 additionally comprising an additional retrieving attachment, wherein the additional retrieving attachment comprises a hook attachment having a J-shaped hook portion mounted on the attachment portion, the J-shaped hook portion comprising a linear main extent and an arcuate extent connected to an end of the main extent.

3. The device of claim 2 wherein the J-shaped hook portion has a width approximately equal to an outer diameter of the distal telescopic section.

4. The device of claim 1 wherein the attachment portion has a connector body adapted for insertion into the recess of the free end of the distal telescopic section.

5. The device of claim 4 wherein the attachment portion has a securing means for selectively securing the connector body in the recess of the free end.

6. The device of claim 5 wherein the securing means comprises a release button, the release button being positioned in a cavity formed in the connector body, the release button having a protruding condition for extending through the aperture formed in the wall of the distal telescopic section and a retracted condition permitting insertion of the connector body into the recess.

7. The device of claim 6 wherein the attachment portion has a biasing means being provided for biasing the release button into the protruding condition, the biasing means comprising a spring.

8. The device of claim 1 wherein the second and third extents having a width approximately two times the width of the diameter of the distal telescopic section.

9. The device of claim 1 wherein a width and a length of the second extent being approximately equal.

10. The device of claim 1 wherein the first and third extents have substantially equal length dimensions extending parallel to the longitudinal direction of the handle.

11. The device of claim 1 wherein a length of the second extent is approximately twice a length of the first extent.

12. The device of claim 1 additionally comprising an additional retrieving attachment, wherein the additional retrieving attachment comprises a sweep attachment having a sweep portion mounted on the attachment portion, the sweep portion comprising a first extent extending in a substantially parallel direction to the longitudinal axis of the handle and a second extent extending in a direction substantially perpendicular to the longitudinal axis of the handle.

13. The device of claim 12 wherein the second extent has a lip extending in a direction substantially parallel to the direction of the longitudinal axis of the handle.

14. The device of claim 12 wherein the second extent has a length that is approximately 1.25 times greater than a length of the first extent.

15. The device of claim 12 wherein the first and second extents have a width approximately two times the width of the diameter of the distal telescopic section.

16. The device of claim 1 additionally comprising an additional retrieving attachment, wherein the additional retrieving attachment comprises a rake attachment having a rake portion mounted on the attachment portion, the rake portion having a first extent extending in a direction substantially parallel to the longitudinal axis of the handle and a plurality of tines extending in a direction substantially perpendicular to the first extent.

17. The device of claim 16 wherein free ends of the tines having an arcuate tip.

18. An object retrieving kit for extending the reach of a user, comprising:

an extendable handle having a collapsed condition and an extended condition, the handle comprising a plurality of telescopic sections connected in telescopic relationship, a distal one of the telescopic sections having a free end, the free end having a recess extending into the free end of the distal telescopic section, an aperture being formed in a wall of the distal telescopic section and being in communication with an interior of the recess;

a hook attachment removably mountable on the free end of the distal telescopic section, the hook attachment having a J-shaped hook portion and an attachment portion, the J-shaped hook portion comprising a linear main extent and an arcuate extent connected to an end of the main extent, the J-shaped hook portion having a width approximately equal to an outer diameter of the distal telescopic section, the attachment portion having a connector body adapted for insertion into the recess of the free end of the distal telescopic section, the attachment portion having a securing means for selectively securing the connector body in the recess of the free end, the securing means comprising a release button, the release button being positioned in a cavity formed in the connector body, the release button having a protruding condition for extending through the aperture formed in the wall of the distal telescopic section and a retracted condition permitting insertion of the connector body into the recess, a biasing means being provided for biasing the release button into the protruding condition, the biasing means comprising a spring;

a scoop attachment removably mountable on the free end of the distal telescopic section, the scoop attachment having a scoop portion and an attachment portion, the scoop position comprising a first extent extending substantially parallel to a longitudinal axis of the handle, a second extent extending substantially perpendicular to the longitudinal axis of the handle, and a third extent extending substantially parallel to the longitudinal axis of the handle, the second and third extents having a width approximately two times the width of the diameter of the distal telescopic section, a width and a length of the second extent being approximately equal, the third extent having a lip extending toward the first extent, the first and third extents having substantially equal length dimensions extending parallel to the longitudinal direction of the handle, a length of the second extent being approximately twice a length of the first extent, the attachment portion having a connector body adapted for insertion into the recess of the free end of the distal telescopic section, the attachment portion having a securing means for selectively securing the connector body in the recess of the free end, the securing means comprising a release button, the release button being positioned in a cavity formed in the connector body, the release button having a protruding condition for extending through the aperture formed in the wall of the distal telescopic section and a retracted condition permitting insertion of the connector body into the recess, a biasing means being provided for biasing the release button into the protruding condition, the biasing means comprising a spring;

a sweep attachment removably mountable on the free end of the distal telescopic section, the sweep attachment having a first extent extending in a substantially parallel direction to the longitudinal axis of the handle, a second extent extending in a direction substantially perpendicular to the longitudinal axis of the handle, the second extent having a lip extending in a direction substantially parallel to the direction of the longitudinal axis of the handle, the second extent having a length that is approximately 1.25 times greater than a length of the first extent, the first and second extents having a width approximately two times the width of the diameter of the distal telescopic section, the attachment portion having a connector body adapted for insertion into the recess of the free end of the distal telescopic section, the attachment portion having a securing means for selectively securing the connector body in the recess of the free end, the securing means comprising a release button, the release butt-on being positioned in a cavity formed in the connector body, the release button having a protruding condition for extending through the aperture formed in the wall of the distal telescopic section and a retracted condition permitting insertion of the connector body into the recess, a biasing means being provided for biasing the release button into the protruding condition, the biasing means comprising a spring; and a rake attachment removably mountable on the free end of the distal telescopic section, the rake attachment having a first extent extending in a direction substantially parallel to the longitudinal axis of the handle, and a plurality of tines extending in a direction substantially perpendicular to the first extent, free ends of the tines having an arcuate tip, wherein the rake attachment has at least four tines, wherein the tines each have a length of at least two inches, the attachment portion having a securing means for selectively securing the connector body in the recess of the free end, the securing means comprising a release button, the release button being positioned in a cavity formed in the connector body, the release button having a protruding condition for extending through the aperture formed in the wall of the distal telescopic section and a retracted condition permitting insertion of the connector body into the recess, a biasing means being provided for biasing the release button into the protruding condition, the biasing means comprising a spring; and wherein the handle comprises three telescopic sections, each of the telescopic sections being approximately two feet long.

* * * * *